United States Patent [19]

Blumenthal

[11] 3,974,508

[45] Aug. 10, 1976

[54] AIR PURGING SYSTEM FOR A PULSED DROPLET EJECTING SYSTEM

[75] Inventor: John Blumenthal, Wickliffe, Ohio

[73] Assignee: Gould Inc., Chicago, Ill.

[22] Filed: Dec. 16, 1974

[21] Appl. No.: 532,865

[52] U.S. Cl. .............................................. 346/140 R

[51] Int. Cl.[2] .......................................... G01D 15/18

[58] Field of Search ............... 346/140, 75; 239/125

[56] References Cited

UNITED STATES PATENTS

| | | | |
|---|---|---|---|
| 3,108,673 | 10/1963 | Green | 197/1 |
| 3,683,212 | 8/1972 | Zoltan | 346/140 X |
| 3,832,579 | 8/1974 | Arndt | 346/140 X |

OTHER PUBLICATIONS

Leslie et al., Reaming and Plugging Ink Jet Nozzles; IBM Tech. Disc. Bulletins, vol. 16, No. 3, Aug. 1973, p. 879.

Helinski, E. F.; Start Up–Turn Off System For Ink Jet Printer, IBM Tech. Disc. Bulletin, vol. 17, No. 2, July 1974. pp. 370–371.

*Primary Examiner*—Joseph W. Hartarv

*Attorney, Agent, or Firm*—Eber J. Hyde

[57] ABSTRACT

Pulsed droplet ejecting systems are described of the type in which a conduit conducts liquid from a reservoir to an orifice. The liquid is under zero or slightly negative pressure, and surface tension in the orifice prevents flow in the absence of other forces. An electroacoustic transducer is coupled to the liquid and when an electric pulse is applied a pressure wave travels in the liquid to the orifice causing ejection of a droplet of liquid. Systems of this type work well only when free of entrapped air, a condition difficult to achieve in prior art designs. Means are disclosed for readily and reliably filling such systems without entrapment of air pockets. A second conduit is permanently or temporarily joined to the first conduit adjacent to or in place of the orifice, and means are provided for temporarily causing rapid flow of liquid from the reservoir through the first conduit into and through the second conduit. The conduits have sufficiently large cross sections so that the flow can be fast enough to sweep out all air pockets that might otherwise remain if flow during filling the system were through a single conduit and out a typical small orifice.

5 Claims, 9 Drawing Figures

AIR PURGING SYSTEM FOR A PULSED DROPLET EJECTING SYSTEM

Reference is hereby made to the application of Donald J. Koneval for Pulsed Droplet Ejecting System, Ser. No. 532,864, filed Dec. 16, 1974, and assigned to the same assignee as the present application, now abandoned.

BACKGROUND OF THE INVENTION b 1. Field of the Invention

This invention pertains to systems for ejecting small quantities of liquid upon command, for use in apparatus such as ink jet printers and recorders. It relates particularly to systems in which the energy required to eject a droplet is obtained from an electric pulse acting through an electroacoustic transducer, no pump or equivalent source of pressure being employed during operation. Such systems may be described as passive systems.

2. Description of the Prior Art

Passive droplet ejecting systems are described in U.S. Pat. Nos. 3,452,360 to Williamson, 3,683,212 to Zoltan; 3,708,798 to Hildenbrand et al.; 3,747,126 to Stemme; 3,787,884 to Demer and 3,832,579 to Arndt. Very small quantities of air entrapped in these systems cause erratic and unreliable operation. Clearing such systems of air is difficult because generally the orifice size is so small that even relatively large priming pressures cannot produce sufficient flow to dislodge small air pockets that adhere in small crevasses or even to relatively smooth surfaces.

SUMMARY OF THE INVENTION

The object of this invention is to provide a passive droplet ejecting system that can readily and reliably be filled with liquid without entrapment of deleterious quantities of air, and that can be purged of air that may find its way into the system after prolonged or improper operation.

According to the invention there is provided a first conduit having a first end and a second end, and an orifice with means for connecting the orifice to the second end of the conduit. A second conduit having a first and a second end is also provided, and means are provided for connecting the second ends of the conduits together. Means are provided for temporarily causing flow of liquid into the first end of the first conduit, through the two conduits and out the first end of the second conduit with sufficient flow velocity to sweep out substantially all of the air from the system. The temporary flow then is terminated. An electroacoustic transducer is coupled to the liquid in one of the conduits and is adapted, when electrically pulsed, to apply a pressure pulse to the liquid, developing a pressure wave in the liquid which travels to the orifice and causes ejection of a droplet of liquid therefrom.

The temporary flow is caused by reducing the pressure at the first end of the second conduit, and means are provided to prevent fluid flow through the orifice during the temporary priming flow.

DESCRIPTION OF THE PREFERRED EMBODIMENTS

Figures 1, 1A, 1B, 1C, 2, 2A, 3, 4:
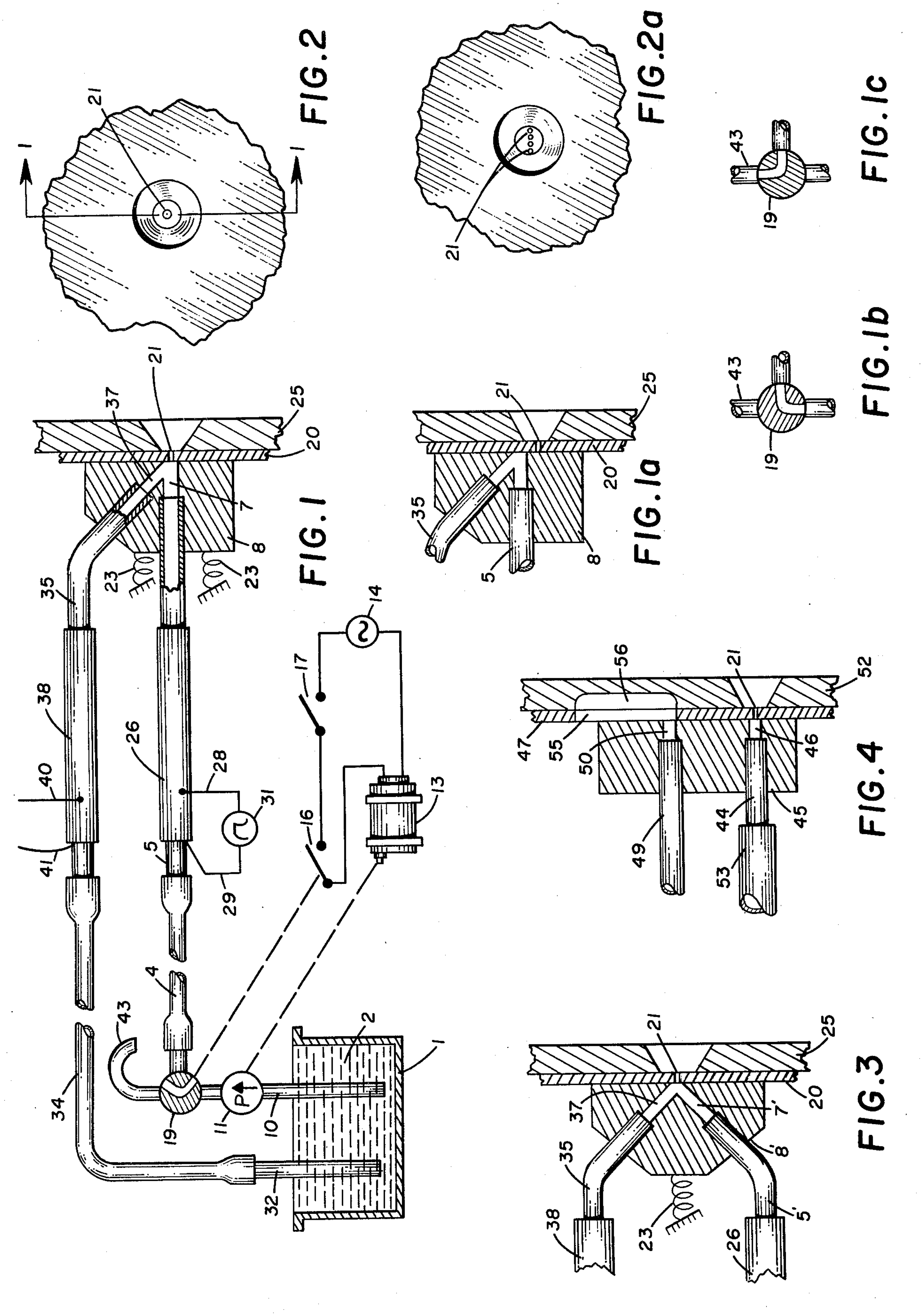
FIG. 1 is a schematic representation of one form of the invention, with the orifice region shown in section, and in droplet ejection condition.
FIG. 1*a* shows the orifice region of FIG. 1 in condition for filling the system with liquid or purging it of air.
FIGS. 1*b* and 1*c* show different positions for the valve of FIG. 1.
FIG. 2 is a partial end view of the orifice arrangement of FIG. 1.
FIG. 2*a* is a partial end view of a modified orifice arrangement which may be substituted for that of FIG. 2.
FIG. 3 shows a modification of the orifice region of FIG. 1.
FIG. 4 shows still another modification of the orifice region.

In FIG. 1, reservoir means 1, which is open to the atmosphere, contains liquid 2 such as ink. A first conduit comprises flexible tube 4 of material such as plasticized polyvinyl chloride, a thin walled relatively rigid tube 5, and opening 7 in member 8. Preferably tube 5 if formed of glass but metal or plastic may be used. Member 8 may be made of plastic or metal, and tube 5 may be secured therein by adhesive, not shown.

A tube 10 is immersed in the liquid 2 in reservoir means 1 and supplies liquid to pump 11 when the latter is operating. Pump 11 connects to the first end of the first conduit comprising tube 4, through a valve 19. Pump 11 is driven by electric motor 13 which is energized by electric power from source 14 when switches 16 and 17 are closed. Switch 16 is an interlock switch mechanically connected to valve 19 so that the pump may be operated only when the valve is in the position shown in FIG. 1*b*.

The first conduit comprising tubes 4 and 5 and opening 7 terminates at orifice plate 20, having orifice 21 shown communicating with opening 7 in FIG. 1. Member 8 and orifice plate 20 are not permanently secured together. They are maintained in sliding engagement by means such as springs 23 and backup plate 25. The confronting faces of member 8 and orifice plate 20 are suitably finished to provide a seal against leakage of fluid therebetween.

A cylindrical piezoelectric transducer 26 made of piezoelectric ceramic material such as lead zirconate-lead titanate surrounds a portion of tube 5 and is secured thereto by adhesive means such as epoxy cement, not shown. Transducer 26 has electrodes on the inner and outer cylindrical surfaces and is radially polarized. Terminal wires 28 and 29 each connects an electrode to pulse source 31.

The pulses from source 31 may represent, for example, video information from a facsimile transmitter, or, as other examples, the pulses may be derived from a computer or other source for the purpose of printing alphanumeric characters or bar codes.

In operation of the portion of FIG. 1 so far described, as a pulsed droplet ejecting system, the conduit 4,5,7 and orifice 21 are filled with liquid 2 from reservoir means 1 as will later be described. Each time an electric pulse is supplied by source 31, transducer 26 contracts radially due to the piezoelectric effect and squeezes tube 5 to a smaller diameter. This applies a pressure pulse to liquid 2 within tube 5 causing a pressure wave to travel to orifice 21 and eject a droplet of liquid. As the electric pulse falls to zero the transducer 26 and tube 5 return to their original diameters and the ejected liquid is replaced by flow in the conduit due to the urging of capillary forces in orifice 21.

Contraction of transducer 26 and the resulting pressure pulse applied to the liquid also sends a pressure wave toward reservoir means 1. To prevent deleterious pressure wave reflection at the junction of flexible tube 4 and tube 5 it is desirable to select material and dimensions for tube 4 as taught in U.S. Pat. No. 3,832,579 to Arndt and assigned to the same assignee as the present invention.

The first end of a second conduit comprises the lower end of tube 32 which tube is immersed in liquid 2 in reservoir means 1. The conduit further comprises flexible tube 34 similar to tube 4, rigid tube 35 and opening 37 in member 8. The conduit terminates at its second end at the junction of opening 37 and orifice plate 20. Intersecting openings 7 and 37 in member 8 act as means for connecting the second ends of the two conduits together.

Preferably the dimensions and material of flexible tube 34 are selected to prevent deleterious reflections at the junction of the two tubes as previously mentioned regarding tubes 4 and 5. It is not necessary that the tubes forming the second conduit have the same dimensions as the corresponding tubes of the first conduit.

When it is desired to fill the system with liquid, or to free it of air pockets which may accumulate in the filled system, the first step is to slide member 8 relative to orifice plate 20 until orifice 21 no longer communicates with openings 7 and 37 of the two conduits as shown in FIG. 1*a*. For this purpose any suitable means, not shown, may be used such as a hand operated lever, or a solenoid or air cylinder.

Next valve 19 is turned to the position shown in FIG. 1*b*. Then switch 17 is closed starting motor 13 which drives pump 11. This causes rapid circulation of liquid 2 through tubes 4,5 and opening 7 of the first conduit and thence through opening 37, and tubes 35, 34 and 32 of the second conduit back to reservoir means 1. The rapid flow sweeps the system free of air and fills it with liquid 2.

In order to achieve sufficient flow with reasonable pressure it is necessary for the diameters of the conduits to be large relative to the diameter of the orifice. Typical orifice dimensions are 0.002 to 0.005 inch diameter by 0.01 inch long. Typically, the minimum diameter of any portion of each conduit should be about 0.015 inch, and larger diameters are desirable.

After the system has been filled with air-free liquid, the pump is stopped, valve 19 is returned to the position shown in FIG. 1 and the orifice 21 is realigned with openings 7 and 37 of the conduits. Capillary forces draw liquid into orifice 21.

The sliding of member 8 with respect to orifice plate 20 to remove orifice 21 from communication with the conduits described above is a convenience feature but is not a requirement. If the orifice remains in communication with the conduits during the filling of the conduits with liquid, a stream of the liquid will be ejected through the orifice and some means must be provided to dispose of this liquid. However, the amount of liquid diverted through the orifice is too small to interfere with the air-free filling operation.

A second transducer 38 is shown surrounding tube 35 of the second conduit with lead wires 40,41 connected to the electrodes. If desired, wires 40,41 may be connected to pulse source 31 in which case transducer 26 may be omitted and transducer 38 then causes ejection of a droplet from orifice 21 each time an electric pulse occurs at source 31. In some circumstances it may be desirable to employ both transducers, connected to the same or different sources.

It is not necessary that valve 19 be turned to the position shown in FIG. 1 during normal droplet ejection operation. Instead it may be left in the position shown in FIG. 1*b*. In this case, depending on the type of pump 11, replacement of liquid ejected from orifice 21 may be jointly through the two conduits, or if the pump does not permit passage of liquid when idle, then such replacement is entirely through conduit 32,34,35,37 just as though valve were in the position shown in FIG. 1. Best droplet ejecting results, however, have been obtained when transducer 26 is employed for pulsing and when the liquid input to conduit 4,5,7 is blocked by valve 19 as shown in FIG. 1 or by use of a pump 11 which does not pass liquid when inoperative.

The conduit system of FIG. 1 may be drained of liquid merely by turning valve 19 to the position shown in FIG. 1*c*. The level of liquid 2 in reservoir means 1 is below the elevation of most of the conduit system, thus when the valve opens the first conduit to the atmosphere through tube 32, the liquid siphons out of the conduits through tube 32 to reservoir means 1. Capillary forces in orifice 21 prevent emptying of the system when valve 19 is in the positions shown in FIGS. 1 or 1*b*.

The system as described has a single orifice 21 and is suitable for use in reconstructing graphic material a dot at a time as in a facsimile printer. FIG. 2*a*, similar to FIG. 2, illustrates how a plurality of orifices 21 may be provided for ejecting a plurality of droplets simultaneously to print a bar as in a bar code.

It is preferable that the second conduit comprising opening 37 be connected to the first conduit comprising opening 7, with opening 37 located above opening 7 to facilitate the sweeping out of air bubbles which may collect in the vicinity of orifice 21.

In FIG. 1 tube 5 of the first conduit is shown in axial alignment with orifice 21 when the latter is in pulse operating position. For some purposes this is a convenient arrangement, but it is not a requirement as both conduits may approach the orifice at an angle as shown in FIG. 3.

In FIG. 1, intersecting openings 7 and 37 in member 8 provide means for connecting the two conduits together. A similar arrangement is shown in FIG. 3. A different means for connecting the second ends of the conduits together during filling with liquid or purging of air is shown in FIG. 4.

In FIG. 4, one conduit comprises relatively rigid tube 44 and opening 46 in member 45. The opening terminates at orifice plate 47. The other conduit comprises tube 49 and opening 50 which also terminates at orifice plate 47, and the latter is supported by plate 52.

Figure 5:
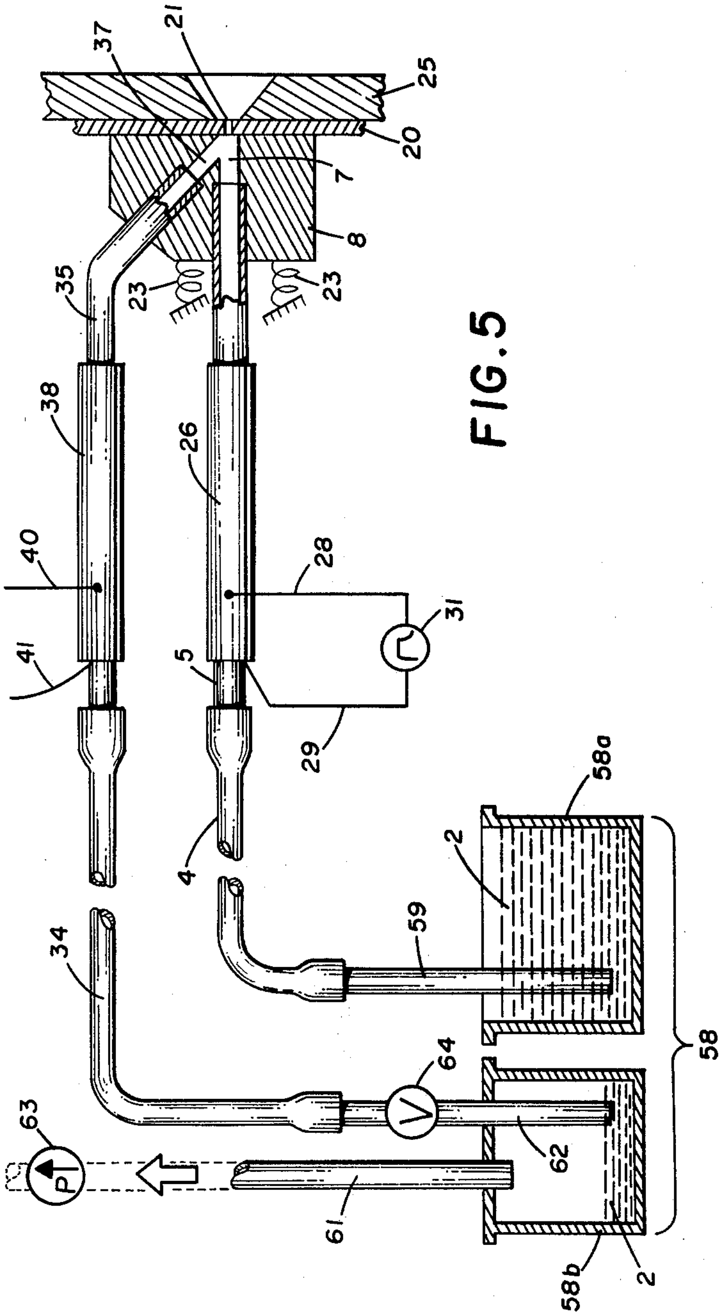
FIG. 5 is a schematic representation of a variation of the invention, with the orifice region shown in section, and in droplet ejecting condition.

Both conduits also comprise flexible tubes, not shown, but similar to tubes 4 and 34 of FIG. 1, and these tubes lead to reservoir means also as shown in FIG. 1; or as shown in FIG. 5 to be described in a later paragraph. The conduit which comprises tube 44 must communicate with a supply of liquid in the reservoir means during pulsed droplet ejection. A cylindrical transducer 53 similar to transducers 26 or 38 of FIG. 1 surrounds and is secured to tube 44 and may be pulsed by a pulse source such as 31 in FIG. 1. After the conduit comprising tube 44 is filled with liquid as presently to be described, each pulse applied to transducer 53 causes ejection of a droplet from orifice 21 which communicates with opening 46.

To fill the conduit comprising tube 44 with liquid 2, sliding relative motion is effected between member 45 and orifice plate 47 until both conduits are in communication with opening 55 in orifice plate 47. This removes orifice 21 from communication with opening 46. Backup plate 52 has a cavity 56 in alignment with opening 55.

The combination of opening 55 and cavity 56 provides means for connecting the two conduits together during filling with liquid or purging the air from the conduit comprising opening 46. Means for providing rapid flow of liquid through the conduits may be provided as in FIG. 1. The conduit comprising tube 44 may connect at its first end to valve 19 of FIG. 1, and the conduit comprising tube 49 may lead directly to reservoir means 1 through tube 32 of FIG. 1. In this case, pump 11 of FIG. 1 must be of a type which permits passage of liquid when the pump is inactive, and valve 19 must be in the position shown in FIG. 1b during pulsed operation. On the other hand, if the first ends of the two conduits are interchanged, then flow through inactive pump 11 and valve 19 is not required during droplet ejection.

FIG. 5 shows an alternate arrangement for causing rapid temporary flow to insure filling the system with liquid free of entrapped air. The conduit comprising tubes 4 and 5, openings 7 and 37, tubes 35 and 34 may be identical with those of FIG. 1.

Reservoir means 58 comprises reservoir 58*a* which is open to the atmosphere and contains liquid 2. Reservoir means 58 also comprises liquid trap 58*b* into which some liquid 2 flows during filling or purging of the system as hereafter described.

Tube 59 immersed in liquid 2 in reservoir 58*a* supplies liquid to conduit 4,5,7.

Tube 61 leads from sealed liquid trap 58*b* to means for reducing the air pressure within the trap such as a vacuum pump 63. Tube 62 leads from trap 58*b* to valve 64 which connects to flexible tube 34.

When it is desired to fill the system with liquid, or to purge the system of air which may enter due for example to improper operation, member 8 is given sliding motion relative to orifice plate 20 until orifice 21 is out of communication with openings 21 and 37. Next, valve 64 is opened. Atmospheric pressure acting on liquid 2 in reservoir 58*a* then forces liquid with relatively high velocity through the conduits and valve 64 into trap 58*b*. When the system is filled with air-free liquid, valve 64 is closed and orifice 21 is realigned with opening 7. Droplets then may be ejected by applying electric pulses from source 31 to transducer 26 surrounding conduit section 5 or to transducer 38 surrounding conduit section 35; or both transducers may be pulsed.

As in FIG. 1, the orifice arrangement may be replaced by that of FIG. 3 or FIG. 4. When the arrangement of FIG. 4 is used in FIG. 5, the conduit which comprises tube 44 in FIG. 4 should go directly to reservoir 58*a* through tube 59.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An air purging system for a pulsed droplet ejecting device comprising:

a first conduit having a first end and a second end;
a droplet ejecting orifice;
means for coupling said orifice to said second end of said conduit;
a second conduit having a first end and a second end;
means for coupling the second ends of said first and second conduits together;
means for temporarily causing liquid to flow into the first end of said first conduit, through said conduit into and through said second conduit and out said first end of said second conduit, with sufficient velocity to sweep out substantially all of the air from said system; and
an electroacoustic transducer coupled to the liquid in one of said conduits and adapted, after termination of said temporary flow, to apply a pressure pulse to said liquid causing ejection of a droplet of liquid from said orifice.

2. An air purging system for a pulsed droplet ejecting device as described in claim 1 in which said means for causing said temporary flow comprises means for reducing the pressure at the first end of said second conduit; and in which means are provided for preventing flow of fluid through said orifice during said temporary flow.

3. An air purging system for a pulsed droplet ejecting device as described in claim 2 in which said orifice is in a plate which is in slidable engagement with the second end of said first conduit, and said means for preventing flow of fluid through said orifice comprises means for causing sliding displacement of said conduit with respect to said plate until said orifice is out of communication with said conduit.

4. An air purging system for a pulsed droplet ejecting device as described in claim 3 in which said orifice is one of a plurality of spaced orifices from each of which liquid is ejected when a pressure pulse is applied by said transducer.

5. An air purging system for a pulsed droplet ejecting device as described in claim 1 in which said orifice is one of a plurality of spaced orifices from each of which liquid is ejected when a pressure pulse is applied by said transducer.

* * * * *